United States Patent [19]

Thompson et al.

[11] 4,374,203

[45] Feb. 15, 1983

[54] STABLE CLAY SLURRIES

[75] Inventors: Thomas D. Thompson, Flemington; John F. Gergel, Perth Amboy; Peter Economou, Millington, all of N.J.

[73] Assignee: Yara Engineering Corporation, Elizabeth, N.J.

[21] Appl. No.: 356,935

[22] Filed: Mar. 10, 1982

[51] Int. Cl.³ ................................................ C09C 1/42
[52] U.S. Cl. ................................ 501/148; 106/288 B; 106/308 N
[58] Field of Search ...................... 106/288 B, 308 N; 501/146, 148

[56] References Cited

U.S. PATENT DOCUMENTS

| | | | |
|---|---|---|---|
| 3,846,147 | 11/1974 | Tapper | 106/288 B |
| 3,892,587 | 7/1975 | Abercrombie | 106/288 B |
| 3,961,979 | 6/1976 | Abercrombie | 106/308 N |
| 4,017,324 | 4/1977 | Eggers | 501/148 |
| 4,309,222 | 1/1982 | Hoyt | 501/148 |

*Primary Examiner*—James Poer
*Attorney, Agent, or Firm*—Buell, Blenko, Ziesenheim & Beck

[57] ABSTRACT

A stable calcined clay slurry and method of preparing the same are provided by adding to a calcined clay suspension containing at least 50% clay in aqueous medium about 0.30% to 0.49% by weight of anionic polymer and about 0.007% to 0.011% by weight of cationic polymer by weight in the slurry.

6 Claims, No Drawings

STABLE CLAY SLURRIES

This invention relates to stable clay slurries and particularly to stable slurries of calcined kaolin which can be shipped in tank cars and trucks without deleterious effects of dilatant settling and which are readily pumped from the shipping tank by conventional means.

Kaolin is a well known inorganic pigment used as a filler in or a coating on paper, as a pigment in paints, rubber, resins and other materials. In its naturally occurring state it is in the form of a hydrated aluminum oxide of generally hexagonal plate-like configuration. Kaolin, in its natural hydrated form is used in large quantities. However, when calcined, kaolin loses its water of hydration and becomes brighter than naturally occurring hydrated kaolin and contributes a higher level of opacity to coatings made from it. Once kaolin has been dehydrated it does not return to the hydrated form on contact with water, but retains its new characteristics.

Since calcined kaolin is used in large tonnages, it would be desirable to ship it as high solids slurries in tank cars or tank trucks as many other pigments and extenders are shipped. Unfortunately, however, calcined kaolin is extremely dilatant in slurry form and only moderate solids levels can be achieved (50% to 65% solids). At these moderate solids levels, two very serious obstacles to slurry shipment of calcined kaolin occur. The first of these obstacles is dilatant settling when the slurries are allowed to stand without agitation. The second serious obstacle is that the slurries are too dilatant to be pumped from tanks by conventional means.

This problem has been the subject of considerable research and has been a long standing problem in the industry. Some of the attempts to solve this problem are represented in the patented art. For example, Tapper U.S. Pat. No. 3,846,147 attempted to solve this problem by adding to calcined clay suspensions of greater than 40% solids an alkalizing agent in amount sufficient to provide a pH of at least 8 and sufficient to stabilize and make the slurry pumpable. Among the alkalizing agents he proposes are sodium pyrophosphate (TSPP), potassium tripolyphosphate (KTPP), sodium carbonate (NaCO₃) and certain anionic polymers. Eggers U.S. Pat. No. 4,017,324 attempted to solve the problem by adding 8% to 33⅓% hydrated kaolin clay to the calcined clay along with a suspending agent such as bentonite clay, hydroxyethyl cellulose, methyl cellulose, carboxymethyl cellulose and a dispersing agent such as a non-ionic surfactant, an anionic surfactant or an alkanolamine. Unfortunately, none of the prior art methods have been completely successful in solving the problem. They are effective to a degree in some cases but totally ineffective in others.

We have discovered that the problems relating to dilatancy in calcined clays which have made slurry shipments unsatisfactory can be eliminated by using combinations of cationic and anionic polymers in the calcined clay slurries. This combination in appropriate amounts gives minimum settling of kaolin in the tank while minimizing the dilatancy effects so that the slurry is pumpable by conventional means, both of which have evaded prior art attempts at solution.

The significance of the present invention and its value can perhaps best be understood by the following examples showing prior practices and the present invention as applied to identical clay compositions. When no thickeners or suspending agents are used in the preparation of both fine particle size and coarse particle size calcined clays, the results which appear in the following Examples I and II are obtained.

EXAMPLE I

| ASTRA-PAQUE (Fine particle calcined clay) 50% solids | | |
|---|---|---|
| Brookfield Viscosity | | |
| RPM | c.P.s. | Hercules Viscosity |
| 10 | 50 | 18 dynes at 100 RPM |
| 20 | 38 | |
| 50 | 50 | |
| 100 | 68 | |

EXAMPLE II

| Glomax LL (Coarse particle calcined clay) 55% solids | | |
|---|---|---|
| Brookfield Viscosity | | |
| RPM | c.P.s. | Hercules Viscosity |
| 10 | 55 | 18 dynes at 150 RPM |
| 20 | 50 | |
| 50 | 52 | |
| 100 | 67 | |

As shown in Examples I and II, the fine particle size calcined clays cannot be made down at as high a solids content as coarse particle size calcined clays. Even though the fine particle size calcined clay was made down at lower solids, it exhibits greater dilatancy, as indicated by the Hercules viscometer reading.

Various non-ionic thickeners and suspending aids (cellulosics), cationic polymers and anionic polymers were compared alone and in various combinations with the present invention to illustrate the uniquely synergistic combinative effect obtained by compositions according to the invention.

In all of the following examples the slurries were made down using the following general procedure.
1. Slowly add calcined clay to appropriate amount of water and dispersant (stir 5 minutes).
2. Add in appropriate thickener and/or polymer (stir 10 minutes). Cellulosics were dissolved in the makedown water prior to clay addition.
3. Adjust pH if necessary.

EXAMPLE III

Table I Sample 1B
A coarse calcined clay slurry containing non-ionic thickener was prepared as follows:
1. To 123.0 g. water was added 25 g. of a 1% solution CMC-7 H (Hercules brand of Cellulose Gum, sodium carboxymethyl cellulose) and 0.05 g. sodium hexametaphosphate.
2. Added slowly 151.3 g. coarse calcined clay and stir 15 minutes.
3. The pH adjusted to 7.4 using NaOH. The results appear in Table I hereafter.

EXAMPLE IV

Table V Sample 4A
A fine calcined clay slurry was prepared as in Example III above using a 50% solids fine particle size using 137.5 g. water plus 25 g. of 1% solution of CMC-7H for every 137.2 g. of fine particle clay.
The results appear in Table V.

EXAMPLE V

Table II Sample 1C
1. To 123.0 g. water was added 0.20 g. of a Bentone LT (N.L. Industries brand of organo montmorillonite) while stirring. After Bentone LT was completely dispersed, added 15 g. of a 1% solution of CMC-7H (Hercules brand Cellulose Gum sodium carboxymethyl cellulose) plus 0.05 g. sodium hexametaphosphate.
2. Added slowly 151.3 g. of coarse calcined clay and stirred for 15 minutes.
3. The pH adjusted to 7.4 with NaOH. The results appear in Table II.

EXAMPLE VI

Table III Sample 2B
1. To 73 g. water was added 50 g. of a 1% solution Klucel G (Hercules brand of Cellulose Gum hydroxypropyl cellulose) and 0.05 g. sodium hexametaphosphate. Stirred to dissolve the polyphosphate completely.
2. Added slowly 151.3 g. of coarse calcined clay and stirred for 15 minutes.
3. After clay was completely wetted out and dispersed, added in 0.15 g. Daxad CP-1 (W. R. Grace Company brand water soluble cationic polymer).

The results appear in Table III.

EXAMPLE VII

Table III Sample 7A
1. To 87 g. of water was added 50 g. of a 1% of Natrosol 250 GR (Hercules brand Cellulose Gum, hydroxyethyl cellulose) and mixed.
2. Add slowly 136.5 g. of fine particle size calcined clay and stir for 15 minutes.
3. After clay is completely wetted out and dispersed, add in 0.2 g. of a 50% solution of Ionac PE-100 (Tanatex Sybron Corp. cationic polyelectrolyte of the quaternary polyamine type).

The results appear in Table III.

EXAMPLE VIII

Table IV Sample 1A
1. To 122.5 g. of water was added 0.05 g. sodium hexametaphosphate and stirred until completely dissolved.
2. Added slowly 150.8 g. of coarse particle size calcined clay and stirred for 15 minutes.
3. After clay was completely wetted out and dispersed, added in 1.62 g. of a 27.5% solids solution of Acrysol ASE-60 (Rohm & Haas Company brand of an acid containing crosslinked acrylic emulsion copolymer). Adjusted pH to 8.0 with NaOH.

The results appear in Table IV.

EXAMPLE IX

Table V Sample 4E
1. To 111.6 g. of water was added 25 g. of a 1% solution of CMC-7H (Hercules brand of Cellulose Gum, sodium carboxymethyl cellulose) and 0.05 g. sodium hexametaphosphate. Stirred to dissolve polyphosphate completely.
2. Added slowly 136.8 g. of fine particle size calcined clay and stirred for 15 minutes.
3. After clay was completely wetted out and dispersed, added 1.5 g. of a 27.5% solids solution of Acrysol ASE-60 (Rohm & Haas Company brand of an acid containing crosslinked acrylic emulsion copolymer). Adjust pH to 8.0 with NaOH.

The results appear in Table V.

EXAMPLE X

Table VI Sample 2A
1. To 133.5 g. of water slowly added 137 g. of fine particle size calcined clay. Stirred until clay is completely wetted out and dispersed (approximately 15 minutes).
2. Added 1 g. of a 1.0% solution Ionac PE-100 (Tanatex Sybron Corp. brand of 50% quaternary polyamine) slowly and stirred 10 minutes.
3. Added 1.5 g. of 27.5% solids solution of Acrysol ASE-60 (Rohm & Haas brand of an acid containing, crosslinked acrylic emulsion copolymer) and stirred 5 minutes.
4. Adjusted pH to 8.0 using NaOH.

The results appear in Table VI.

The foregoing and various other non-ionic thickeners and suspending aids (cellulosic), cationic polymers and anionic polymers were similarly used in varying amounts and combinations as appear hereafter in Tables I, II, III, IV, V and VI as follows:

TABLE 1

| | Non-Ionic Thickeners | | |
|---|---|---|---|
| | Brookfield Viscosity cPs | | |
| Samples | 10 rpm | 100 rpm | Comments |
| Coarse Clay Control at 55% solids | 55 | 67 | Extremely dilatant, settles to hard cake rapidly |
| 1 A 0.07% CMC-7H (based on dry clay) | 300 | 104 | Dilatant, hard cake on bottom in 1 day |
| 1 B 0.16% CMC-7H | 1250 | 250 | Dilatant, hard cake on bottom |
| 1 C 0.27% CMC-7H | 1800 | 870 | Dilatant, settled but cake not as hard |
| 1 D 0.33% CMC-7H | 4200 | 2400 | Dilatant, slight settling |
| 2 A 0.33% Natrosol 250 GR | 1000 | 250 | Dilatant, hard cake on bottom |
| 3 A 0.07% Natrosol HHR | 650 | 145 | Dilatant, hard cake on bottom |
| 4 A 0.16% Klucel G | 460 | 116 | Dilatant, hard cake on bottom |
| 4 B 0.33% Klucel G | 560 | 138 | Dilatant, hard cake on bottom |
| 5 A 0.07% Cellosize QP-15,000 | 960 | 180 | Dilatant, hard cake on bottom |
| 6 A 0.07% Bentone LT | 560 | 150 | Dilatant, hard cake on bottom |
| 6 B 0.16% Bentone LT | 1250 | 250 | Dilatant, hard cake on bottom |

CMC-7H = Hercules Cellulose Gum sodium carboxymethyl cellulose
Natrosol 250 GR = Hercules Cellulose Gum hydroxyethyl cellulose
Natrosol HHR = Hercules Cellulose Gum hydroxyethyl cellulose
Klucel G = Hercules Cellulose Gum hydroxypropyl cellulose
Bentone LT = NL Industries organo montmorillonite
Cellosize QP-15,000 = Union Carbide Company hydroxyethyl cellulose

TABLE II

Combinations of Non-Ionic Thickeners

| Samples | Brookfield Viscosity cPs | | Comments |
|---|---|---|---|
| | 10 rpm | 100 rpm | |
| Coarse Clay Control at 55% solids | 55 | 67 | Extremely dilatant, settles out rapidly |
| 1 A 0.07% CMC-7H + 0.07% Bentone LT | 1000 | 270 | Dilatant, hard cake on bottom |
| 1 B 0.07% CMC-7H + 0.16% Bentone LT | 1500 | 350 | Dilatant, hard cake on bottom |
| 1 C 0.10% CMC-7H + 0.13% Bentone LT | 1650 | 415 | Dilatant, hard cake on bottom |
| 2 A 0.33% Klucel G + 0.16% Bentone LT | 1060 | 252 | Dilatant, hard cake on bottom |
| 3 A 0.07% Cellosize QP-15,000 + 0.13% Bentone LT | 1550 | 275 | Dilatant, hard cake on bottom |
| 4 A 0.33% Natrosol 250 GR + 0.13% Bentone LT | 1400 | 390 | Dilatant, hard cake on bottom |
| 5 A 0.07% Natrosol HHR + 0.13% Bentone LT | 1400 | 280 | Dilatant, hard cake on bottom |

TABLE III

Cationic Polymers and Non-Ionic Thickeners

| Samples | Brookfield Viscosity cPs | | Comments |
|---|---|---|---|
| | 10 rpm | 100 rpm | |
| Coarse Clay Control at 55% solids | 55 | 67 | Extremely dilatant, settles out rapidly |
| 1 A 0.1% CMC-7H | 750 | 320 | Dilatant, hard cake on bottom |
| 1 B 0.1% CMC-7H + 0.04% Daxad CP-1 | 1250 | 600 | Less dilatant, some settling |
| 1 C 0.09% Daxad CP-1 | 900 | 350 | Dilatant, hard cake on bottom |
| 2 A 0.33% Klucel G | 560 | 138 | Dilatant, hard cake on bottom |
| 2 B 0.33% Klucel G + 0.04% Daxad CP-1 | 2200 | 332 | Slight gel, little settling |
| 2 C 0.33% Klucel G + 0.09% Daxad CP-1 | 9000 | 1600 | Gelled, but easily stirred |
| 3 A 0.07% Cellosize QP-15,000 | 960 | 180 | Dilatant, hard cake on bottom |
| 3 B 0.07% QP-15,000 + 0.04% Daxad CP-1 | 7500 | 1300 | Moderate gel, easily stirred |
| 4 A 0.33% Natrosol GR | 1000 | 250 | Dilatant, hard cake on bottom |
| 4 B 0.33% Natrosol GR + 0.04% Daxad CP-1 | 6400 | 1300 | Moderate gel, easily stirred |
| 5 A 0.07% Natrosol HHR | 650 | 145 | Dilatant, hard cake on bottom |
| 5 B 0.07% Natrosol HHR + 0.04% Daxad CP-1 | 3200 | 620 | Slight gel, easily stirred |
| 6 A 0.33% Klucel G | 560 | 138 | Dilatant, hard pack on bottom |
| 6 B 0.33% Klucel G + 0.04% Daxad CP-1 | 3200 | 640 | Slight gel, easily stirred some settling |
| 6 C 0.33% Klucel G + 0.04% Reten 420 | 8400 | 1080 | Hard gel, dilatant, difficult stirring |
| 6 D 0.33% Klucel G + 0.04% Reten 210 | 3800 | 1400 | Moderate gel, dilatant, difficult stirring |
| Fine Clay at 50% solids | 50 | 68 | Extremely dilatant, settles out rapidly |
| 7 A 0.37% Natrosol 250 GR + 0.07% Ionac PE-100 | 2400 | 480 | Some settling, but not hard packed |
| 7 B 0.66% Natrosol 250 GR + 0.36% Ionac PE-100 | 3800 | 1400 | Some settling, but not hard packed |
| 8 A 0.33% CMC-7H + 0.33% Natrosol 250 GR | 1850 | 460 | Some settling, hard packed on bottom |
| 8 B 0.33% CMC-7H + 0.33% Natrosol 250 GR + 0.13% Ionac PE-100 | 2150 | 560 | Some settling, but not hard packed |
| 9 A 0.33% Klucel G + 11% $Al_2(SO_4)_3$ 18 $H_2O$, pH 3.9 | 10,000 | 5300 | Slight gel, but not settled |
| 9 B 0.33% Klucel G + 11% $Al_2(SO_4)_3$ 18 $H_2O$, pH 4.1 | 12,000 | 4850 | Slight gel, but not settled |
| 9 C 0.33% Klucel G + 11% $Al_2(SO_4)_3$ 18 $H_2O$, pH 4.2 | 13,000 | 5200 | Slight gel, but not settled |
| 9 D 0.33% Klucel G + 11% $Al_2(SO_4)_3$ 18 $H_2O$, pH 5.2 | 1100 | 290 | Dilatant and some settling |
| 9 E 0.33% Klucel G + 11% $Al_2(SO_4)_3$ 18 $H_2O$, pH 6.7 | 1100 | 270 | Dilatant, hard pack on bottom |

Reten 420 = Hercules, Inc. non-ionic high molecular weight acrylic polymer
Daxad CP-1 = W. R. Grace water soluble cationic polymer
Ionac PE-100 = Tanatex Sybron Corporation cationic polyelectrolyte of the quaternary polyamine type (50% quaternary aliphatic polyamine)
Ionac PE-110 = Tanatex Sybron Corporation 44% tertiary aliphatic polyamine
Reten 210 = Hercules Incorporated high molecular weight cationic acrylic polymer (quaternized)
Reten 300 = Hercules Incorporated high molecular weight strong cationic acrylic polymer (quaternized)

TABLE IV

Anionic Polymers

| Samples | Brookfield Viscosity cPs | | Comments |
|---|---|---|---|
| | 10 rpm | 100 rpm | |
| Coarse Clay Control at 55% solids | 55 | 67 | Extremely dilatant, settles out rapidly |
| 1 A 0.30% Acrysol ASE-60 pH 8.0 | 3000 | 820 | Slight settling, some dilatancy |
| 1 B 0.40% Acrysol ASE-60 pH 8.0 | 5000 | 1360 | No settling, weak gel, easily stirred |

TABLE IV-continued

| | Anionic Polymers | | |
|---|---|---|---|
| | Brookfield Viscosity cPs | | |
| Samples | 10 rpm | 100 rpm | Comments |
| Fine Clay Control at 50% solids | 50 | 68 | Extremely dilatant, settles out rapidly |
| 2 A 0.22% Acrysol ASE-60 pH 8.0 | 4100 | 1000 | Moderate settling |
| 2 B 0.44% Acrysol ASE-60 pH 8.0 | 7900 | 2000 | Heavy gel, can be stirred |

Acrysol ASE-60 = Rohm & Haas Company an acrylic acid-containing, crosslinked acrylic emulsion copolymer
Acrysol G-110 = Rohm & Haas Company ammonium polyacrylate

TABLE V

| Combinations of Non-Ionic Thickeners and Anionic Polymers | | | |
|---|---|---|---|
| | Brookfield Viscosity cPs | | |
| Samples | 10 rpm | 100 rpm | Comments |
| Coarse Control at 55% solids | 55 | 67 | Extremely dilatant, settles out rapidly |
| 1 A 0.33% Klucel G | 560 | 138 | Dilatant, hard cake on bottom |
| 1 B 0.33% Klucel G + 0.11% Acrysol G-110 | 2200 | 480 | Gelled, easily stirred |
| 2 A 0.17% CMC-7H | 1300 | 520 | Dilatant, hard cake on bottom |
| 2 B 0.17% CMC-7H + 0.15% Acrysol G-110 | 1400 | 620 | Some settling, but easily stirred |
| 3 A 0.17% CMC-7H | 1450 | 580 | Dilatant, hard cake on bottom |
| 3 B 0.17% CMC-7H + 0.02% Acrysol ASE-60 | 850 | 390 | Dilatant, decreasing hard cake on bottom |
| 3 C 0.17% CMC-7H + 0.06% Acrysol ASE-60 | 1200 | 530 | Dilatant, decreasing hard cake on bottom |
| 3 D 0.17% CMC-7H + 0.11% Acrysol ASE-60 | 1700 | 710 | Dilatant, decreasing hard cake on bottom |
| 3 E 0.17% CMC-7H + 0.17% Acrysol ASE-60 | 2100 | 770 | Dilatant, decreasing hard cake on bottom |
| 3 F 0.17% CMC-7H + 0.22% Acrysol ASE-60 | 3300 | 1160 | Soft settling |
| Fine Clay Control at 50% solids | 55 | 68 | Extremely dilatant, settles out rapidly |
| 4 A 0.18% CMC-7H | 700 | 230 | Hercules viscosity, 18 dynes at 100 RPM, hard cake on bottom |
| 4 B 0.18% CMC-7H + 0.06% Acrysol ASE-60 pH 8.0 | 850 | 285 | Hercules viscosity, 18 dynes at 100 RPM, decreasing hard cake on bottom |
| 4 C 0.18% CMC-7H + 0.15% Acrysol ASE-60 pH 8.0 | 1100 | 380 | Hercules viscosity, 18 dynes at 100 RPM, decreasing hard cake on bottom |
| 4 D 0.18% CMC-7H + 0.30% Acrysol ASE-60 pH 8.0 | 1300 | 440 | Hercules viscosity, 18 dynes at 100 RPM, decreasing hard cake on bottom |
| 4 E 0.18% CMC-7H + 0.30% Acrysol ASE-60 pH 8.0 | 2300 | 750 | Hercules viscosity, 18 dynes at 200 RPM, soft settling |
| 5 A 0.18% CMC-7H + 0.30% Acrysol ASE-60 pH 6.0 | 1350 | 550 | pH adjustment made with NaOH, hard cake on bottom |
| 5 B 0.18% CMC-7H + 0.30% Acrysol ASE-60 pH 6.5 | 1400 | 540 | pH adjustment made with NaOH, decreasing hard cake on bottom |
| 5 C 0.18% CMC-7H + 0.30% Acrysol ASE-60 pH 7.0 | 2000 | 685 | pH adjustment made with NaOH, decreasing hard cake on bottom |
| 5 D 0.18% CMC-7H + 0.30% Acrysol ASE-60 pH 7.5 | 1600 | 530 | pH adjustment made with NaOH, decreasing hard cake on bottom |
| 5 E 0.18% CMC-7H + 0.30% Acrysol ASE-60 pH 8.0 | 2100 | 740 | Soft settling |

TABLE VI

| Combinations of Cationic and Anionic Polymers | | | |
|---|---|---|---|
| | Brookfield Viscosity cPs | | |
| Samples | 10 rpm | 100 rpm | Comments |
| Fine Clay Control at 50% solids | 50 | 68 | Extremely dilatant, settles out rapidly |
| 1 A 0.49% Acrysol ASE-60 pH 8.0 | 21,000 | 9500 | No settling dilatant |
| 1 B 0.49% Acrysol ASE-60 + 0.004% Ionac PE-100 | 13,000 | 4600 | No settling dilatant |
| 1 C 0.49% Acrysol ASE-60 + 0.007% Ionac PE-100 | 11,000 | 5000 | No settling, dilatant |
| 1 D 0.49% Acrysol ASE-60 + 0.011% Ionac PE-100 | 3400 | 950 | No settling, less dilatant |
| 1 E 0.49% Acrysol ASE-60 + 0.013% Ionac PE-100 | 1050 | 330 | Soft settling, least dilatant |
| 2 A 0.30% Acrysol ASE-60 + 0.007% Ionac PE-100 | 3800 | 920 | Little or no settling, Hercules viscosity 18 dynes at 260 RPM |
| Coarse Clay Control at 55% solids | 55 | 67 | Extremely dilatant, settles out rapidly |

TABLE VI-continued
Combinations of Cationic and Anionic Polymers

| Samples | Brookfield Viscosity cPs 10 rpm | 100 rpm | Comments |
|---|---|---|---|
| 3 A 0.45% Acrysol ASE-60 pH 8.0 | 8300 | 2510 | No settling, but dilatant |
| 3 B 0.45% Acrysol ASE-60 + 0.007% Ionac PE-100 | 3000 | 820 | Best with regard to dilatancy and settling |
| 3 C 0.45% Acrysol ASE-60 + 0.007% Ionac PE-100 | 4100 | 1100 | Slight settling, moderately dilatant |
| 3 D 0.45% Acrysol ASE-60 + 0.007% Reten 300 | 5000 | 1310 | Slight settling, moderately dilatant |

In all of the foregoing Examples the fine clay used was "Astra-Paque," Georgia Kaolin Company's brand of calcined fine clay having a particle size of 80% below 2 microns equivalent spherical diameter, 95% below 5 microns and 100% below 10 microns. The coarse clay used was "Glomax LL," Georgia Kaolin Company's brand of calcined coarse clay having a particle size of 52% below 2 microns equivalent spherical diameter, 85% below 5 microns and 95% below 10 microns.

The results of the foregoing tests show that:

1. If one or more non-ionic thickeners is used alone, viscosity can be increased sufficiently to prevent settling, but dilatancy of the slurry is increased rather than decreased. This is unsatisfactory.
2. Combinations of non-ionic thickeners and cationic polymers are used to control viscosity; hard cake settling can be decreased more efficiently than when using either the non-ionic thickeners or cationic polymers alone. Combinations of cellulosics and cationic polymers tend to increase thixotropy.
3. Anionic polymers, such as Acrysol ASE-60, tend to be similar to non-ionic thickeners but more thixotropic; and, thereby, prevent settling at lower viscosities.
4. Combinations of non-ionic thickeners and anionic polymers show no particular advantage over the use of these viscosity modifiers independently.
5. Combinations of cationic and anionic polymers result in the best calcined clay slurries. The appropriate combination gives minimum settling while minimizing dilatancy, as shown by Example X, Table VI, Sample 2 A.

The combination of cationic and anionic polymers appears to correct the deficiencies of each and to provide where the ratio of cationic polymer to anionic polymer is in the range of about 0.30% to 0.49% anionic polymer by weight in the slurry and about 0.007% to 0.011% cationic polymer by weight in the slurry.

In the foregoing specification we have set out certain preferred practices and embodiments of our invention, however, it will be understood that this invention may be otherwise embodied within the scope of the following claims.

We claim:

1. A stable calcined clay suspension comprising at least 50% by weight of calcined clay in an aqueous medium in the presence of about 0.30% to 0.49% by weight of anionic polymer and about 0.007% to 0.011% by weight of cationic polymer in the slurry.

2. A stable calcined clay suspension as claimed in claim 1 wherein the anionic polymer is present at 0.30% by weight and the cationic polymer is present at 0.007% by weight.

3. A stable calcined clay suspension as claimed in claim 1 or 2 wherein the anionic polymer is an acid containing cross linked acrylic emulsion copolymer and the cationic polymer is a cationic polyelectrolyte of the quaternary polyamine type containing about 50% quaternary aliphatic polyamine.

4. A process for preparing a stable calcined clay suspension comprising the steps of:
(a) admixing calcined clay in water with a dispersant to provide a suspension containing at least 50% by weight of calcined clay,
(b) adding about 0.30% to 0.49% anionic polymer and about 0.007 to 0.011% cationic polymer by weight to the slurry of calcined clay with agitation of the slurry; and
(c) adjust the pH to about pH 7 to pH 8.

5. A process as claimed in claim 4 wherein the anionic polymer is added at 30% by weight and the cationic polymer at 0.007% by weight.

6. A process as claimed in claim 4 or 5 wherein the anionic polymer is an acid containing cross linked acrylic emulsion copolymer and the cationic polymer is a cationic polyelectrolyte of the quaternary polyamine type containing about 50% quaternary aliphatic polyamine.

* * * * *